(12) United States Patent
Schilling et al.

(10) Patent No.: US 7,500,070 B2
(45) Date of Patent: Mar. 3, 2009

(54) METHODS AND APPARATUS FOR IMPROVED RAID 1 MIRROR RE-SYNCHRONIZATION

(75) Inventors: Jason B. Schilling, Colorado Springs, CO (US); Brad D. Besmer, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 238 days.

(21) Appl. No.: 11/508,473

(22) Filed: Aug. 23, 2006

(65) Prior Publication Data

US 2008/0052457 A1    Feb. 28, 2008

(51) Int. Cl.
G06F 13/00    (2006.01)
(52) U.S. Cl. .................. 711/162; 711/135; 711/167
(58) Field of Classification Search ............. 711/135, 711/144, 113, 162, 167
See application file for complete search history.

(56) References Cited

U.S. PATENT DOCUMENTS

| | | | |
|---|---|---|---|
| 6,922,754 B2 * | 7/2005 | Liu et al. | 711/138 |
| 7,085,895 B2 * | 8/2006 | Kishi | 711/135 |
| 2002/0108017 A1 * | 8/2002 | Kenchammana-Hoskote et al. | 711/113 |
| 2003/0172316 A1 * | 9/2003 | Tremblay et al. | 714/7 |
| 2003/0212869 A1 * | 11/2003 | Burkey | 711/162 |
| 2004/0054851 A1 * | 3/2004 | Acton et al. | 711/118 |
| 2005/0210318 A1 * | 9/2005 | Marks et al. | 714/7 |
| 2006/0020752 A1 * | 1/2006 | Schnapp et al. | 711/113 |
| 2007/0168706 A1 * | 7/2007 | Humlicek | 714/6 |
| 2007/0294474 A1 * | 12/2007 | Panabaker et al. | 711/113 |

* cited by examiner

*Primary Examiner*—Matt Kim
*Assistant Examiner*—Hal Schnee
(74) *Attorney, Agent, or Firm*—Duft Bornsen & Fishman, LLP

(57) ABSTRACT

Systems and methods for improving performance of a re-synchronization process in a RAID level 1 storage system. In one aspect a local cache memory associated with the second or mirrored disk drive is enabled during the re-synchronization operation but left disabled during normal operation processing host requests. The cache is flushed to the persistent medium of the second disk drive before resuming normal I/O request processing. In another aspect normal I/O request processing is interleaved with portions of the processing for re-synchronization of the mirrored disk drive. Normal I/O request processing proceeds for a first period of time. Re-synchronization processing for a portion of the mirrored information then proceeds (with local cache memory of the mirrored disk drive enabled) for a second period of time.

10 Claims, 3 Drawing Sheets

METHODS AND APPARATUS FOR IMPROVED RAID 1 MIRROR RE-SYNCHRONIZATION

BACKGROUND OF THE INVENTION

1. Field of the Invention

The invention relates generally to storage systems using redundant array of independent drives ("RAID") storage management techniques and more particularly relates to improvements for re-synchronization of RAID level 1 mirrored storage devices.

2. Discussion of Related Art

In storage systems it is well known to apply RAID management techniques to enhance reliability, performance, or both. The RAID standards provide for a number of different management levels each providing a different balance of reliability enhancements and performance impacts. For example, RAID level 1 defines simple mirroring of data. Each disk drive (or portion of a disk drive) is associated with a corresponding mirror disk drive (or mirrored portion of another disk drive) on which a duplicate copy of written data is retained. Thus, in accordance with RAID level 1 mirroring, each host I/O write request records the host-supplied data both on the primary disk drive of the identified RAID level 1 volume of the storage device as well as on a mirror disk drive associated with the primary disk drive. As is also well known in the art, such RAID level 1 mirroring may record any number of duplicate copies for still further redundancy to prevent against failure. RAID level 1 mirroring as compared to other RAID levels provides its redundancy, and hence reliability enhancement, by maintaining a complete duplicate copy of the host-supplied data.

Under certain conditions as are well known in the art, it may become necessary to reconstruct or re-synchronize the information stored on the mirrored disk drive. In general such reconstruction or re-synchronization is performed by reading information from the primary disk drive and writing the retrieved information back to the mirrored disk drive. Such re-synchronization may entail reading and writing all of the data from the primary drive back onto the mirrored disk drive or may entail selective copying by determining which data needs to be read and re-recorded on the mirrored disk drive. In either case, this re-synchronization process can be extremely time consuming.

In such a RAID storage system, one or more RAID controllers are coupled to a plurality of disk drives to provide the desired RAID level of management. Each RAID controller typically provides a substantial cache memory for storing host supplied data until such time as it can be most efficiently written to the primary and mirrored disk drive. This use of storage controller cache memory is key to the performance of RAID storage systems. It is also generally known in the art that, in addition to cache memory residing on the RAID storage controller, each disk drive may include substantial cache memory useful for improving write performance for that disk drive. In other words, each individual disk drive controller may receive data for a write request directed to it from the RAID storage controller and may complete the write by simply storing the supplied data in its local cache memory until a more convenient time for posting or flushing the data from cache to the persistent storage medium of the disk drive (e.g., the magnetic or optical recordable medium within the disk drive).

To reduce the time required for such re-synchronization it could be desirable to utilize the local cache memory on the mirrored disk drive to improve the write performance when performing a re-synchronization operation. However, due to the reliability requirements associated with RAID storage management, local cache memory associated with an individual disk drive in a RAID storage subsystem is typically unused or disabled. Rather, RAID storage management techniques tend to rely on the cache memory associated with the RAID storage controller to improve performance. This cache memory associated with the storage controller (as distinct from the local cache memory in each disk drive) may be nonvolatile to improve reliability and may also be duplicated in a redundant cache memory of a redundant storage controller. The cache memory of the storage controller is therefore more reliable and may recovery from fault conditions. Thus, RAID storage management techniques tend to disable use of any local cache memory associated with each individual disk drive of the storage system and rely solely on the cache memory of the storage controller.

As presently practiced, especially in view of the disabling of local cache memory on disk drive as of a RAID storage subsystem, re-synchronization of a RAID level 1 volume to synchronize data on a mirrored disk drive from the contents of the primary disk drive remains a time consuming operation.

It is evident from the above discussion that a need exists for an improved structure and method for improving performance of RAID level 1 re-synchronization between the contents of a primary disk drive and that of its associated who mirrored disk drive.

SUMMARY OF THE INVENTION

The present invention solves the above and other problems, thereby advancing the state of the useful arts, by providing systems and methods for improving performance of a re-synchronization process in a RAID level 1 storage system. In one aspect a local cache memory associated with the second or mirrored disk drive is enabled during the re-synchronization operation but left disabled during normal operation processing host requests. The cache is flushed to the persistent medium of the second disk drive before resuming normal I/O request processing. In another aspect normal I/O request processing is interleaved with portions of the processing for re-synchronization of the mirrored disk drive. Normal I/O request processing proceeds for a first period of time. Re-synchronization processing for a portion of the mirrored information then proceeds (with local cache memory of the mirrored disk drive enabled) for a second period of time. Processing then repeats the sequence such that normal I/O processing and re-synchronization processing is interleaved and such that the re-synchronization processing benefits from use of the mirrored disk drive's local cache memory.

In one aspect a method is provided for synchronizing a mirrored disk drive from a primary disk drive wherein the mirrored disk drive includes local cache memory. The method comprises processing host I/O requests with the local cache memory disabled and re-synchronizing of the mirrored disk drive and the primary disk drive between completion of a first host I/O request and commencement of a next host I/O request wherein the re-synchronization enables the local cache memory enabled for the duration of the re-synchronization.

Another aspect provides a method operable in a storage system having a RAID level 1 volume including a first disk drive and a second disk drive on which contents of the first disk drive is mirrored. The method comprises repeating steps as follows: Performing host supplied I/O requests for a first period of time. Enabling local cache memory on the second disk drive responsive to completion of I/O requests during the first period of time. Re-synchronizing, for a second period of time, the second disk drive from the contents of the first disk drive responsive to enabling the local cache memory. Disabling the local cache memory responsive to completion of re-synchronization during the second period of time. And flushing the local cache memory responsive to disabling the cache memory and prior to resuming performing I/O requests wherein the step of flushing is operable for a third period of time.

DETAILED DESCRIPTION OF THE DRAWINGS

Figure 1:
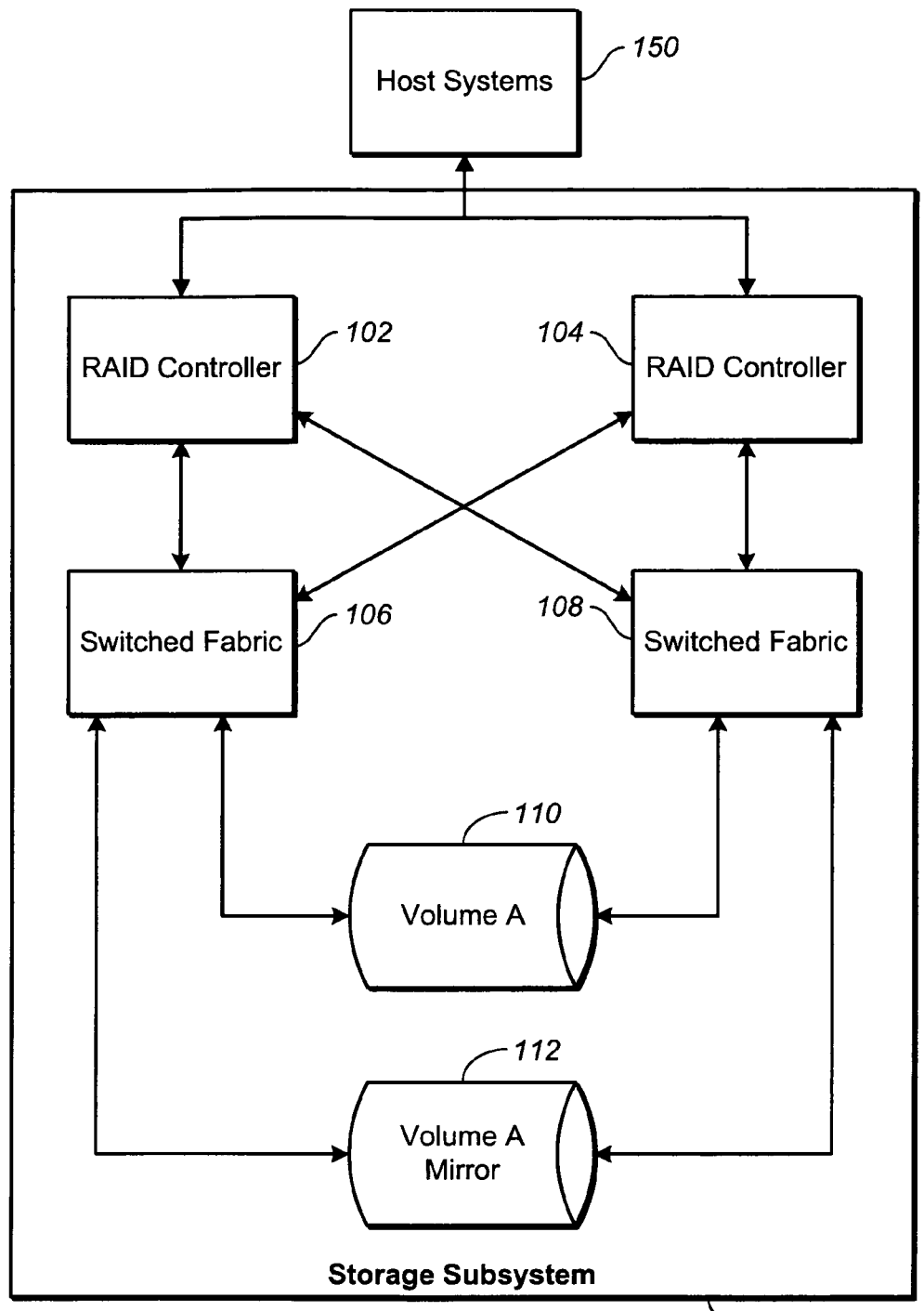
FIG. 1 is a block diagram of a RAID level 1 storage system as present practiced in the art.

FIG. 1 is a block diagram showing a system 100 as presently known in the art in which a RAID storage system 100 is coupled to one or more host systems 150 for processing of I/O requests received therefrom. In accordance with well-known RAID level 1 (mirroring) management techniques, a volume may comprise a pair of redundant disk drives volume A 110 and volume A mirror 112. Further, as generally known in the art, each of the redundant disk drives 110 and 112 may be coupled through redundant switched fabric 106 and 108 to each of redundant RAID controllers 102 and 104. In standard mirrored operation according to RAID level 1 storage management techniques, a RAID controller (102 and/or 104) may receive a write request and record the host supplied data both on volume A 110 and on volume A mirror 112. Thus, a first disk drive 110 and a second or mirrored disk drive 112 receive and store the same information to thereby provide desired redundancy and enhanced reliability.

As is generally known in the art, in recovering from certain types of errors or system changes, it may become necessary at times to re-synchronize the mirrored information on volume A mirror 112 from the information stored on volume A 110. When performing such re-synchronization, the RAID storage controller 102 and/or 104 reads all data from volume A 110 and writes the retrieved data to volume A mirror 112. Various optimizations and heuristics are well known to reduce the substantial volume of data to be recorded in the re-synchronization operation but none the less, re-synchronization as presently practiced in the art can require substantial time.

Those of ordinary skill in the art will readily recognize a variety of equivalent storage subsystems 100 having a larger or smaller number of storage controller devices, including more or less switched fabric connections between the one or more storage controllers and the disk drives, and also having any number of disk drives managed in accordance with any of the well known RAID storage management techniques. Thus, system 100 of FIG. 1 is merely intended as suggestive of all such presently known storage systems in which RAID level 1 mirrored redundancy may be performed.

Figure 2:
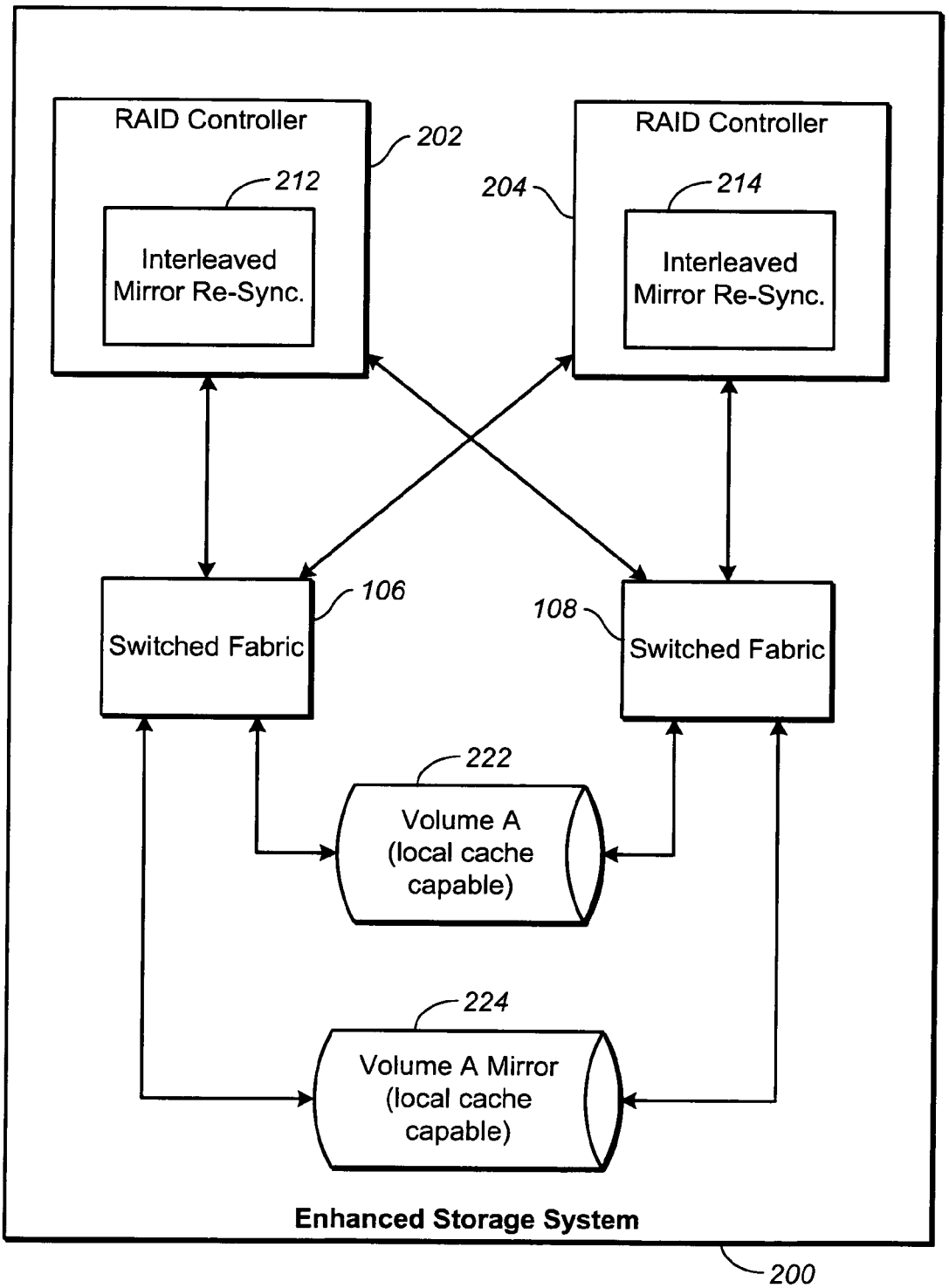
FIG. 2 is a block diagram of an exemplary RAID level 1 storage system enhanced in accordance with features and aspects hereof to interleave re-synchronization processing with normal I/O request processing.

FIG. 2 is a block diagram of an exemplary, enhanced storage system 200 in which features and aspects hereof reduce the time required for re-synchronization of a mirrored disks volume. As above with respect to FIG. 1, one or more RAID controllers 202 and 204 may be coupled through one or more switched fabric media 106 and 108 to two or more redundant disk volumes. In accordance with features and aspects hereof, at least mirrored volume A 224 includes a local cache memory capability that may be selectively enabled and disabled in accordance with directions received from a storage controller 202 and/or 204.

Re-synchronization processing in accordance with features and aspects hereof utilize the local cache memory features of volume A mirror 224 in a manner that improves performance of the re-synchronization process while avoiding complications of using local cache memory of a disk drive in conjunction with normal write request processing. As noted above, although many present day disk drives provide substantial local cache capabilities, such capabilities are typically disabled in the context of RAID storage management techniques. Rather, cache memory associated with the storage controller/controllers per se is relied upon for improving performance of the entire storage subsystem. Local cache memory associated with each individual disk drive of a storage system 200 generally complicates RAID storage management techniques performed within storage controllers 202 and 204. Thus the local cache memory of volume A mirror 224 is disabled while performing write requests received from an attached host system (not shown).

However, in accordance with features and aspects hereof, RAID storage controller 202 and/or 204 enables use of local cache memory within volume A mirror 224 for the duration of processing to re-synchronize the contents of volume A 222 and volume A mirror 224. In particular, storage controller 202 and/or 204 is adapted to enable use of local cache memory of volume A mirror 224 during re-synchronization operation including flushing of data that may be stored in the local cache memory of volume A mirror 224 prior to completion of the re-synchronization operation. The local cache memory of volume A mirror 224 is then disabled by RAID storage controller 202 and/or 204 prior to resuming processing of write requests received from attached host systems.

RAID storage controllers 202 and 204 may each include interleaved mirror re-synchronization elements 212 and 214, respectively. Each interleaved mirror re-synchronization element 212 and 214 may be further adapted in accordance with features and aspects hereof to perform the re-synchronization operation as a plurality of portions wherein each portion of re-synchronization processing is interleaved with corresponding portions of normal processing of received write requests from attached host systems. Thus the re-synchronization process is conducted substantially concurrently with write request processing by interleaving portions of the re-synchronization with ongoing processing of I/O write requests. RAID storage controllers 202 and/or 204 may therefore be adapted to perform I/O write request processing for a first period of time followed by a portion of re-synchronization processing for a second period of time. During the first period of time when processing I/O write requests, local cache memory of volume A mirror 224 is disabled to permit normal RAID storage management by storage controller 202 and/or 204. However, during the second period of time while processing a portion of the re-synchronization operation, local cache memory of volume A mirror 224 is enabled. In addition, RAID storage controller 202 and/or 204 through its interleaved re-synchronization element 212 and/or 214, respectively, is adapted to assure that local cache memory of volume A mirror 224 is fully flushed to the persistent storage medium of volume A mirror 224 prior to resuming processing of I/O write requests. Still further as discussed in detail herein below, interleaved re-synchronization element 212 and/or 214 is adapted to adjust the period of time required to successfully complete the required flush operation as a portion of the second time period during which re-synchronization operations are interleaved with the first time period for processing of I/O write requests.

Those of ordinary skill in the art will readily recognize that storage system 200 of FIG. 2 is intended merely as exemplary of one possible embodiment of features and aspects hereof. In particular, those of ordinary skill in the art will readily recognize that any number of storage controllers may be present within an enhanced storage system 200. Further, any number of storage devices (e.g., disk drive as such as volume A 222 and volume A mirror 224) may be present in such an enhanced storage system 200 in accordance with the needs of a particular application. When applying RAID level 1 storage management mirroring techniques, disk drives are typically logically grouped into pairs—a first disk drive and an associated mirror disk drive (or a first portion and an associated portion on a different disk drive). Still further, those of ordinary skill in the art will readily recognize that any of a variety of well known, commercially available, standardized or customized communication media and techniques may be used for coupling the one or more storage controllers to the plurality of disk drives. Thus, switched fabric 106 and 108 are intended merely as exemplary of one possible such coupling for communications between storage controller and the disk drives of an enhanced storage system 200. Still further, those of ordinary skill in the art will readily recognize a variety of additional elements that may be present in a fully functional enhanced storage system 200. Such additional well-known elements are eliminated for simplicity of FIG. 2 and for brevity of this discussion.

Figure 3:
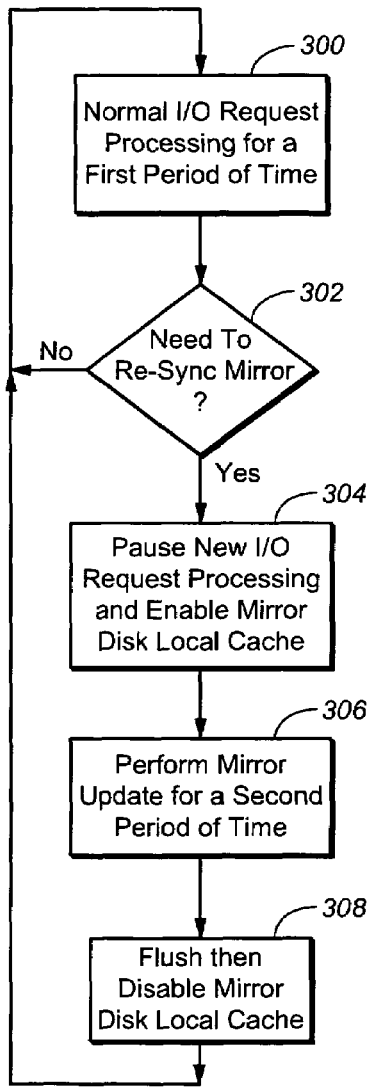
FIGS. 3 through 5 are flowcharts describing exemplary processes in accordance with features and aspects hereof to interleave re-synchronization processing with normal I/O request processing, to selective enable and disable use of the local cache memory of the mirrored disk drive, and to dynamically adjust the apportionment of time in the system for normal I/O processing, for re-synchronization processing, and for cache flush operations.
Figure 4:
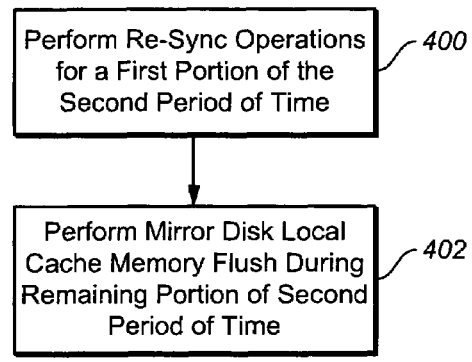
Figure 5:
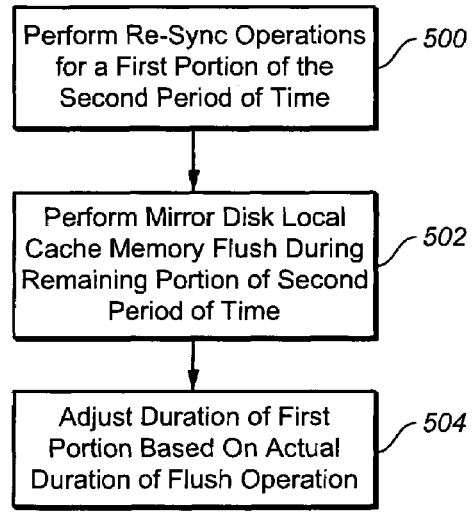

FIGS. 3 through 5 are flowcharts describing exemplary methods operable within a storage controller of an enhanced storage system operable in accordance with features and aspects hereof to reduce elapsed time in performing a re-synchronization operation for a RAID level 1 logical volume. In general, as noted above, features and aspects hereof utilize local cache memory features of the mirrored storage device to improve performance of the re-synchronization operation when writing data to the mirrored disk drive. Features and aspects hereof also include assuring complete flush of the local cache memory of the mirrored disk drive to the persistent storage medium of the mirrored disk drive (e.g., the magnetic or optical recordable medium of the mirrored disk drive.).

In particular, FIG. 3 shows an exemplary method in accordance with features and aspects hereof operable within an enhanced storage system to improve the performance of any required re-synchronization operation. FIG. 3 represents processing within an enhanced storage system to utilize at the local cache memory of the mirrored disk drive of and to interleave re-synchronization processing with ongoing processing of I/O write requests. Generally, FIG. 3 shows a method for synchronizing a mirrored disk drive from a primary disk drive wherein the mirrored disk drive includes local cache memory. The exemplary method shown processes host I/O requests with the local cache memory disabled. The method then re-synchronizes the mirrored disk drive and the primary disk drive between completion of one host I/O request and commencement of a next host I/O request wherein the re-synchronization enables the local cache memory enabled for the duration of the re-synchronization. In another aspect, FIG. 3 shows an exemplary method operable in a storage system having a RAID level 1 volume including a first (e.g., primary) disk drive and a second (e.g., mirrored) disk drive on which contents of the first disk drive is mirrored. The method repeatedly performs the following steps. The method performs host supplied I/O requests for a first period of time. The method then enables local cache memory on the second disk drive responsive to completion of I/O requests during the first period of time. The method then resynchronizes, for a second period of time, the second disk drive from the contents of the first disk drive responsive to enabling the local cache memory. Next, the method disables the local cache memory responsive to completion of re-synchronization during the second period of time. Lastly, the method flushes the local cache memory responsive to disabling the cache memory and prior to resuming performing I/O requests wherein the step of flushing is operable for a third period of time.

Processing of FIG. 3 performs normal I/O request processing until a need is detected to initiate re-synchronization operations to synchronize the data stored on both the principle disk drive (or portion thereof) and its associated mirrored disk drive (or portion thereof). Element 300 therefore represents processing to perform a normal I/O request received from an attached host system. The processing continues for up to a maximum duration of a first pre-determined period of time. The duration of the first period of time may be any suitable pre-determined period of time appropriate for the particular application allowing sufficient time to process a reasonable number of pending write requests before suspending to allow time for re-synchronization processing.

Element 302 then determines whether a need has arisen to initiate or continue re-synchronization operations. If no re-synchronization operation needs to be initiated or is presently in process, the method continues looping through element 300 performing normal I/O request processing and periodically rechecking whether a re-synchronization process needs to be commenced. If element 302 determines that a re-synchronization operation needs to be initiated or continued, element 304 is operable to pause or suspend new I/O request processing (typically allowing a presently active operation to complete) and to enable the local cache memory of the mirrored disk drive. I/O request processing may preferably be paused at a suitable operation boundary such as completion of the currently executing I/O request or other appropriate operational boundaries well known to those of ordinary skill in the art. Since I/O write request processing generally is performed with the local cache memory disabled, element 304 assures that new write request processing will not be initiated while the local cache memory of the mirrored disk drive has been enabled. Suitable stored indicators or other semaphore constructs readily recognized by those of ordinary skill in the art may be used to preclude further I/O write request processing while the local cache memory is enabled.

Element 306 is then operable to perform an update or synchronization of a portion of the contents of the primary disk drive onto the mirrored disk drive while the local cache memory of the mirrored disk drive is enabled. Thus the re-synchronization operation during this second period of time will proceed more rapidly by utilizing the local cache memory of the mirrored disk drive. The duration of this second period of time during which re-synchronization updates of the mirrored disk drive proceed may be determined in accordance with the needs of a particular application. More specifically, an appropriate balance between the first period of time during which normal I/O processing is performed and the second period of time during which re-synchronization processing is performed may be determined in accordance with the needs of a particular application as a matter of design choice. Lastly, element 308 is then operable for yet another or third period of time to assure that the local cache memory of the mirrored disk drive is flushed to the persistent recordable medium of the mirrored disk drive. While utilization of the local cache memory during re-synchronization by processing of element 306 improves performance, it must be assured by processing of element 308 that all data remaining in the local cache memory is appropriately flushed to the persistent recordable medium prior to resuming normal I/O request processing. Further, when the flush of the local cache memory on the mirrored disk drive is complete, element 308 is also operable to disable the local cache memory of the mirrored disk drive in preparation for resumption of normal I/O request processing. The method then continues looping back to element 300 to resume normal I/O request processing for an appropriate first period of time and then again to repeat processing of elements 304 through 308 until element 302 determines that the need for re-synchronization has been satisfied.

Thus, the exemplary method of FIG. 3 in accordance with features and aspects hereof subdivides a re-synchronization operation into a sequence of portions interleaved with periods of time for processing normal I/O requests. In addition, features and aspects hereof controllably enable and disable use of the local cache memory of the mirrored disk drive during the period of time in which the re-synchronization processing is performed while assuring that the local cache memory is both flushed and disabled prior to returning to a period of time for normal I/O request processing. Those of ordinary skill in the art will readily recognize a variety of equivalent method steps for performing a similar function. In particular, the specific command sequences and controls used for enabling and disabling local cache memory of the mirrored disk drive will be readily apparent to those of ordinary skill and the art as appropriate for any particular manufacturers disk drive model. Further, the duration of each of the particular period of time associated with normal I/O request processing and associated with re-synchronization processing (as well as the period required for flushing the local cache memory) may be determined in accordance with particular performance goals and specifications of particular disk drives (e.g., local cache memory size and performance characteristics of the disk drive).

FIG. 4 is a flowchart describing additional details regarding the processing of a portion of the re-synchronization operation and the associated flush operation of the local cache memory of the mirrored disk drive. More specifically, element 400 shows that re-synchronization operation for a portion of the data to be synchronized is performed during a first portion of the second period of time noted above. As discussed above, normal I/O request processing proceeds for the duration of a first period of time while the re-synchronization operation and associated flush operations combined are performed during a second pre-determined period of time. The second period of time may then be further subdivided to allow processing for re-synchronization operations that may fill the local cache memory of the mirrored disk drive (or even fill the local cache memory multiple times) and to allow for a portion of the second period of time to flush the local cache memory of the mirrored disk drive. Element 402 then represents processing to flush the local cache memory of the mirrored disk drive during a second or remaining portion of the second period of time allocated for the combined operations of re-synchronization and local cache memory flushing. The particular apportionment between the first portion of the second period of time used for re-synchronization operations and the second portion of the second period of time used for flushing the local cache memory of the mirrored disk drive may be in accordance with any appropriate balance established for the particular application performance goals and performance attributes of the mirrored disk drive. Such apportionment will be readily apparent to those of ordinary skill in the art as a matter of design choice.

FIG. 5 is a flowchart similar to that of a FIG. 4 but describing yet another feature and aspect hereof wherein the apportionment of time in the second period of time may be dynamically adjusted in accordance with the requirements of a particular application. One of ordinary skill in the art may establish a baseline initial apportionment of the second period of time between re-synchronization operations and the associated cache flush operation. Such an initial apportionment may be appropriate as an estimated starting point but, in accordance with features and aspects hereof, may be refined and adjusted as re-synchronization and associated cache flush operations proceed. For example, if the re-synchronization operations generate relatively small volumes of updated data to be a written to the mirrored disk drive, the associated cache flush operation may be completed quickly. Thus, the method of FIG. 5 allows for the modification of the apportionment between re-synchronization operations and associated flush operations as well as potentially dynamic adjustment of the duration of the first period of time discussed above versus the second period of time as discussed above.

The method of FIG. 5 commences with element 500, analogous to that of element 400 above, to perform re-synchronization operations during a first portion of the second period of time. Element 502, analogous to element 402 above, then performs the flush operation for the local cache memory of the mirrored disk drive during any remaining portion of the second period of time. Element 504 is then operable to adjust the duration of the first and second portions of the second period of time based on any of several performance measures detectable during the re-synchronization and flush operations. For example, the time periods and portions thereof may be adjusted such that the sum of the first period of time and the second period of time is substantially equal to a predetermined total period of time. Or, for example, the time periods and portions thereof may be adjusted as a function of the volume of data to be flushed from the local cache memory. Or, for example, the time periods and portions thereof may be adjusted as a function of the time required to complete the step of flushing.

The one those of ordinary skill in the art will readily recognize a variety of additional method steps associated with a fully functional process exemplified by FIGS. 4 and 5. Thus, the methods of FIGS. 4 and 5 are intended merely as exemplary of features and aspects hereof whereby the re-synchronization operation and the associated cache flush operation may each be apportioned an appropriate part of the second period of time for the interleaved re-synchronization processing. The re-synchronization and cache flush operations in the second period of time may be interleaved with the host write request processing in a first period of time. Further, FIG. 5 provides exemplary embodiments of features and aspects hereof to dynamically adjust the apportionment of the second period of time between the re-synchronization processing and the associated local cache memory flush operations.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method for synchronizing a mirrored disk drive from a primary disk drive wherein the mirrored disk drive includes local cache memory, the method comprising:
   processing host I/O requests with the local cache memory disabled;
   re-synchronizing of the mirrored disk drive and the primary disk drive between completion of a first host I/O request and commencement of a next host I/O request wherein the re-synchronization enables the local cache memory for the duration of the re-synchronization, the step of re-synchronizing further comprises:
      enabling the local cache memory;
      re-synchronizing a portion of the mirrored disk drive from the primary disk drive for a first period of time;
      disabling the local cache memory; and
      flushing the contents of the local cache memory to persistent recordable medium of the mirrored disk drive for a second period of time; and
   adjusting the duration of the first period of time and of the second period of time such that the sum of the first period of time and the second period of time is substantially equal to a predetermined total period of time.

2. The method of claim 1 further comprising:
   adjusting the duration of the second period of time as a function of the volume of data to be flushed from the local cache memory.

3. The method of claim 1 farther comprising:
   adjusting the duration of the first period of time and of the second period of time as a function of the time required to complete the step of flushing.

4. A method operable in a storage system having a RAID level 1 volume including a first disk drive and a second disk drive on which contents of the first disk drive is mirrored, the method comprising:
   repeating the steps of:
   performing host supplied I/O requests for a first period of time;
   enabling local cache memory on the second disk drive responsive to completion of I/O requests during the first period of time;
   re-synchronizing, for a second period of time, the second disk drive from the contents of the first disk drive responsive to enabling the local cache memory;
   disabling the local cache memory responsive to completion of re-synchronization during the second period of time;
   flushing the local cache memory responsive to disabling the cache memory and prior to resuming performing I/O requests wherein the step of flushing is operable for a third period of time; and
   adjusting the duration of the second period of time and of the third period of time such that the sum of the second period of time and the third period of time is substantially equal to the first period of time.

5. The method of claim 4
wherein the step of adjusting further comprises:
   adjusting the duration of the second period of time as a function of the volume of data to be flushed from the local cache memory.

6. The method of claim 4
wherein the step of adjusting further comprises:
   adjusting the duration of the third period of time as a function of the time required to complete the step of flushing.

7. A storage system comprising:
   a first disk drive;
   a second disk drive having a local cache memory wherein the local cache memory is controllably enabled and disabled; and
   a storage controller coupled to the first disk drive and coupled to the second disk drive,
   wherein the storage controller is adapted to:
      receive and process write requests from an attached host system by writing host supplied data on the first disk drive and by mirroring the host supplied data on the second disk drive with the local cache memory disabled,
      re-synchronize the data mirrored on the second disk drive with the local cache memory enabled;
      process write requests, for a first period of time, with the local cache memory disabled; and
      perform re-synchronization of the mirrored data on the second disk drive, for a second period of time, with the local cache enabled by re-synchronizing a portion of the mirrored data; and
         flushing the mirrored data from the local cache memory for a third period of time that is a predetermined portion of the second period of time.

8. The system of claim 7
wherein the storage controller is further adapted to interleave processing of write requests with the re-synchronization.

9. The system of claim 8
wherein the storage controller is further adapted to assure that the local cache memory is flushed before resuming processing of write requests following re-synchronization.

10. The system of claim 7
wherein the storage controller is further adapted to adjust the third period of time based on the time required to complete the flushing of mirrored data.

* * * * *